United States Patent
Yang et al.

(10) Patent No.: US 6,516,062 B1
(45) Date of Patent: *Feb. 4, 2003

(54) ECHO CANCELING METHOD AND APPARATUS IN A COMMUNICATION DEVICE

(75) Inventors: Ganning Yang, Irvine, CA (US); Kenneth E. Garey, Irvine, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,123

(22) Filed: Dec. 23, 1998

Related U.S. Application Data

(63) Continuation of application No. 08/568,843, filed on Dec. 7, 1995.

(51) Int. Cl.[7] .................................................. H04M 9/08
(52) U.S. Cl. .............................. 379/406.08; 379/406.09
(58) Field of Search ................................ 379/410, 411, 379/406, 3, 406.01, 406.02, 406.03, 406.04, 406.05, 406.06, 406.07, 406.08, 409.09; 455/570

(56) References Cited

U.S. PATENT DOCUMENTS

| | | | |
|---|---|---|---|
| 4,268,727 A | * | 5/1981 | Agrawal et al. |
| 5,343,522 A | * | 8/1994 | Yatron et al. .......... 379/406.09 |
| 5,379,338 A | * | 1/1995 | Umemoto et al. .......... 455/570 |
| 5,664,011 A | * | 9/1997 | Crochiere et al. |

* cited by examiner

Primary Examiner—Forester W. Isen
Assistant Examiner—Jefferey Harold
(74) Attorney, Agent, or Firm—Akin Gump Strauss Hauer & Feld LLP

(57) ABSTRACT

A bidirectional communication device for transmitting and receiving communications signals in a system which presents a transmission path for conducting a communications signal from the device, a reception path for conducting a communications signal to the device, and an echo path which conducts echo signals from the transmission path to the reception path, the device having an echo canceler connected between the transmission path and the reception path for minimizing echo signals in the transmission path, the echo canceler comprising an adaptive filter for filtering the communications signals from the device according to a filter characteristic having a plurality of filter coefficients, wherein a first group of the coefficients, constituting less than all of the coefficients, has finite filter coefficient values and the remaining ones of the plurality of coefficients have values of zero.

19 Claims, 3 Drawing Sheets

ECHO CANCELING METHOD AND APPARATUS IN A COMMUNICATION DEVICE

This application is a Continuation of application Ser. No. 08/568,843, filed Dec. 7, 1995, which application is incorporated herein by reference.

BACKGROUND OF THE INVENTION

The present invention relates to communication devices such as telephones, and particularly cordless telephones.

The use of adaptive filtering technology to effect echo cancellation in conventional telephone devices is already known in the art. Conventional echo cancellation techniques are described, for example, by Messerschmitt, in a paper entitled Echo Cancellation in Speech and Data Transmission, IEE JOURNAL ON SELECTED AREAS IN COMMUNICATION, Vol. SAC-2, No. 2, March, 1984, 283–296.

Typically, a telephone set is connected by a single wire pair to a four-wire path forming part of the telephone utility. The four-wire path consists of two wires which conduct communication signals in one direction and two wires which conduct signals in the opposite direction. In order to prevent feedback in such a system, the two wires of the telephone set are connected to the four-wire path by a device known as a hybrid which is intended to provide signal isolation between the two wire pairs of the four-wire path.

A hybrid does not, however, prevent echos from being propagated in a loop between two connected telephone sets and when, in conventional telephone equipment, such an echo has a very long delay, as would be experienced in the case of connections via satellites, it is already known to use echo cancelers in the four-wire path near a telephone set. Such cancelers can be constituted, for example, by a finite impulse response (FIR) filter which, as is known, consists of a tapped delay line whose taps are connected to multipliers that multiply the signal at each tap by a filter coefficient, all of the multiplied signals being summed to produce a replica of the echo signal which is to be canceled.

It has further been found that echos will also occur in the hybrid itself due to inherent impedance mismatches associated with the hybrid. In a conventional telephone set, i.e. a telephone set in which the handset is connected to the telephone body by a wire, the echo delay through the hybrid is of such short duration that it is not noticeable to the user.

However, in the case of digital cordless telephones (DCTs) communication signals are transmitted between the handset and the base station in packets, each of which may contain about four milliseconds of audio data. Because of the resulting built-in delay in the transmission of audio data, an echo signal that passes through the hybrid will be perceivable to the user. This problem exists in the general class of Time Division Multiple Access (TDMA) systems.

SUMMARY OF THE INVENTION

It is an object of the present invention to cancel echos which are produced at a telephone set.

A further object of the invention is to perform adaptive echo cancellation in a manner which minimizes required computation resources.

A further object of the invention is to perform adaptation of an echo canceling filter to existing conditions at appropriate times.

These and other objects are achieved by a bidirectional communication device for transmitting and receiving communications signals in a system which presents a transmission path for conducting a communications signal from the device to the telephone network, a reception path for conducting a communications signal to the device from the telephone network, and an echo path which conducts echo signals from the transmission path to the reception path, the device having an echo canceler connected between the transmission path and the reception path for minimizing echo signals in the reception path, the echo canceler comprising an adaptive filter for filtering the communications signals from the device according to a filter characteristic having a plurality of filter coefficients, wherein a first group of the coefficients, constituting less than all of the coefficients, has finite filter coefficient values and the remaining ones of the plurality of coefficients have values that are approximately zero.

DESCRIPTION OF THE PREFERRED EMBODIMENTS

Figure 1:
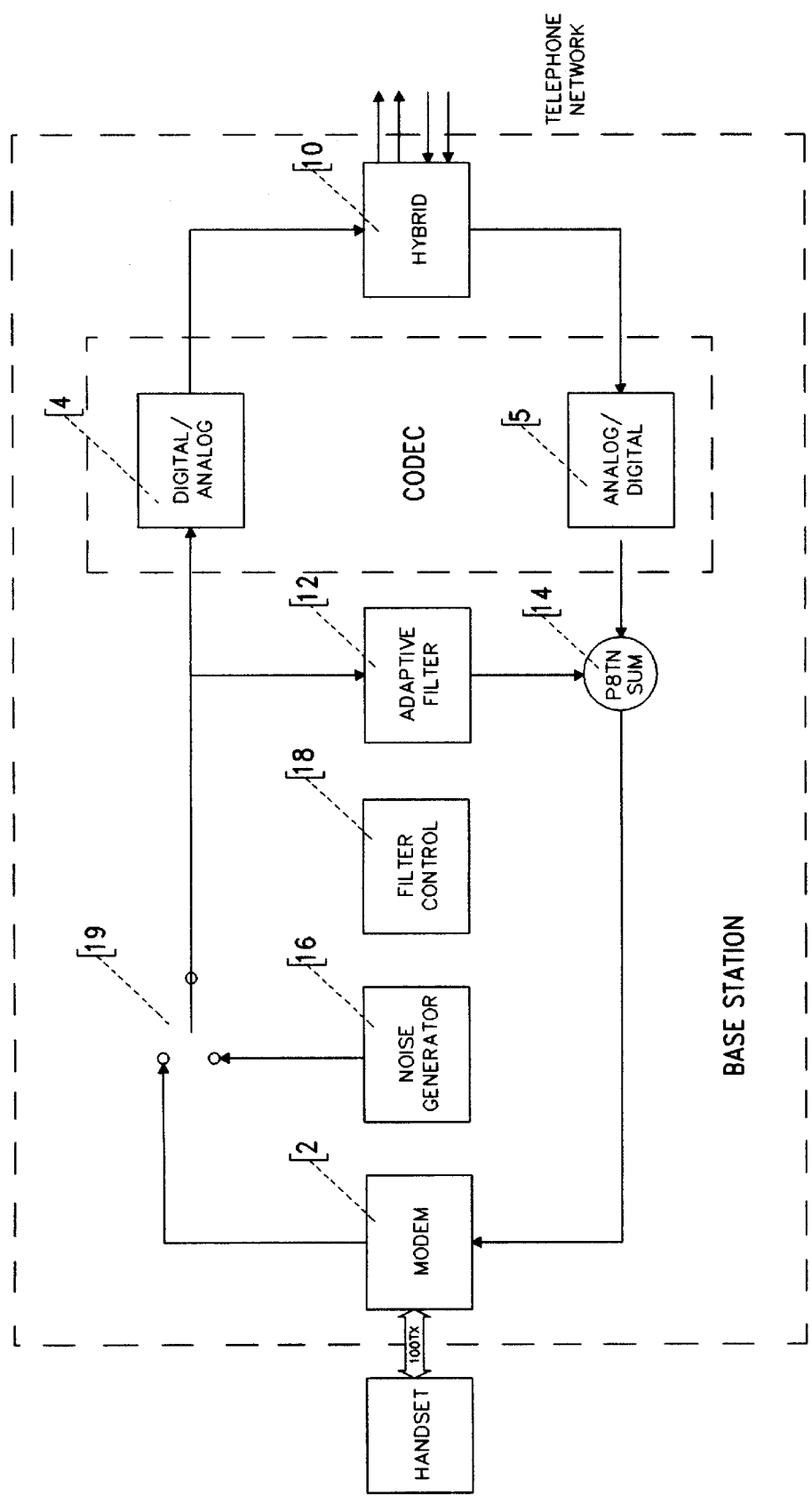
FIG. 1 is a block diagram showing a telephone base station equipped with an echo canceler according to a preferred embodiment of the invention.

FIG. 1 shows the basic components of a DCT base station provided with an echo canceler in the form of an adaptive filter. The fundamental components of the base station include a TDMA modem 2 and a CODEC which is constituted by a digital-analog converter section 4 and an analog-digital converter section 6. Converter sections 4 and 6 are coupled to a telephone line via a hybrid 10 which is here assumed to be an echo channel via which echo signals are propagated from converter section 4 to converter section 6. Modem 2 is a TDMA device. This device shares communication resources by first configuring itself as a transmitter and sending data in burst to the handset. Then modem 2 reconfigures itself as a receiver and receives data in bursts from the handset. Because modem 2 must gather speech data into bursts, and some time is required to reconfigure between the transmitter configuration and the receiver configuration, TDMA systems have an unavoidable delay. Hybrid 10 is constructed to couple converter section 4 to an outgoing wire pair of the telephone line, and to couple converter section 6 to an incoming wire pair of the telephone line. When an impedance mismatch exists at hybrid 10, a portion of the communication signals from converter section 4 will be conducted through hybrid 10 to the input of converter section 6, where they will be converted into digital form and then broadcast by modem 2 to the handset. Because of the inherent delay associated with the TDMA transmission of voice signals to and from the handset, an echo will be perceived by the user and will be found to be objectionable.

Such echo can be effectively neutralized by the connection of an adaptive filter 12 between the path from modem 2 to converter section 4 and the path from converter section 6 to modem 2. Specifically, the input of adaptive filter 12 is connected to the input of converter section 4 and the output of filter 12 is connected to a summing element 14 which also receives, as a second input, a signal appearing at the output of analog-digital converter section 6. The output of summing element 14 provides a signal from which the echo propagated through hybrid 10 is canceled, or at least minimized.

Thus, in the embodiment shown in FIG. 1, the echo canceler is constituted essentially by filter 12 and summing element 14.

Adaptive filter 12 may be a finite impulse response (FIR) filter whose operation is controlled by an LMS algorithm, also known in the art as a stochastic gradient algorithm. However, any other suitable algorithm can be employed and an adaptive filter other than a FIR filter may be utilized. One advantage of operating such a filter on the basis of a LMS algorithm is that such an algorithm requires less computation resources than other types of algorithms. In existing and proposed DCTs, computation resources are limited.

Figure 2:
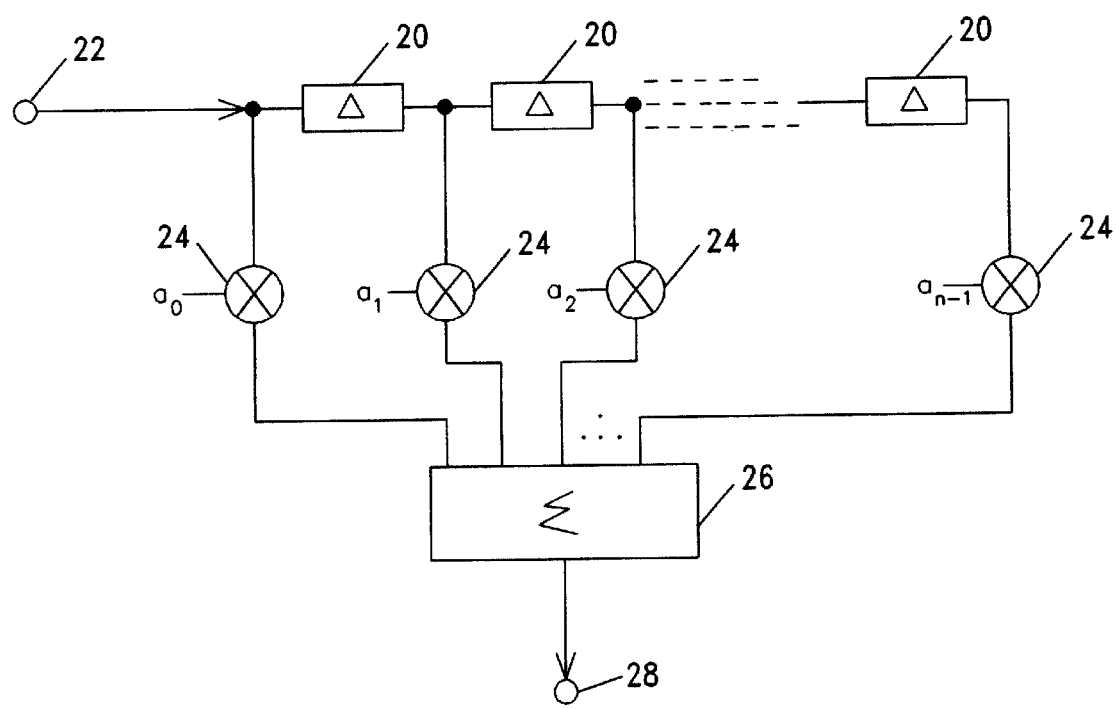
FIG. 2 is a block diagram illustrating the principle of an adaptive filter employed in the embodiment of FIG. 1.

A typical example of adaptive filter 12 can be represented in the manner shown in FIG. 2. The adaptive filter is composed essentially of a series arrangement of delay lines 20, with the first delay line in the series arrangement being coupled to a signal input 22. Input 22 and the output of each delay line 20 are each connected to one input of a respective multiplier 24. The other input of each multiplier 24 is connected to receive a signal representing a respective filter coefficient $a_0, a_1, a_2 \ldots a_{n-1}$. Thus, this delay line is provided with n taps and can be controlled by n filter coefficients.

The outputs of all of the multipliers 24 are connected to a summing element 26 which supplies a filter output signal at output 28.

Filters of the type described above generally have a significant number of taps and the conventional practice in the art is to calculate a finite filter coefficient for each tap. For example, existing FIR adaptive filters may have of the order of 20 or more taps. Adaptive control of all of the taps of such a filter requires significant computational resources. However, Applicants have determined that a highly effective echo cancellation can be achieved by controlling the filter coefficients for only a limited number of the taps and setting all of the other filter coefficients to a value of zero. By way of example, in the case of an adaptive filter which contains 20 taps, it has been found that the assigning of appropriate non-zero filter coefficients to six of the taps will produce a significant echo reduction, while if filter coefficient values are calculated for only four to six of the taps, significant echo reduction cannot be achieved.

When filter coefficients are computed for only a limited number of taps, the required computation resources are reduced.

In further accordance with the invention, the filter coefficients for appropriate taps are selected periodically by the operation of a filter control 16, as shown in FIG. 1. Filter control 16 may be implemented by a digital controller provided in the base station under control of programming stored in a memory also forming part of the base station.

In order to further accommodate the limited computational resources within the base station, filter adaptation is not performed during the course of a telephone conversation, it being assumed that the conditions which would affect operation of adaptive filter 12 will not vary on a short term basis. Thus, according to the invention, adjustment of the adaptive filter coefficients is performed during dialing, i.e. whenever a call is placed from the telephone set. Studies have shown that the most desirable time for adjusting the filter coefficients is in the silent interdigital intervals between actuations of one of the keypads associated with the telephone set, there typically being one keypad on the base station and one keypad on the handset.

Adjustment of the filter coefficients is not effected at the time of an incoming call, it being assumed that the conditions influencing echo behavior have not changed significantly since the last outgoing call.

Figure 3:
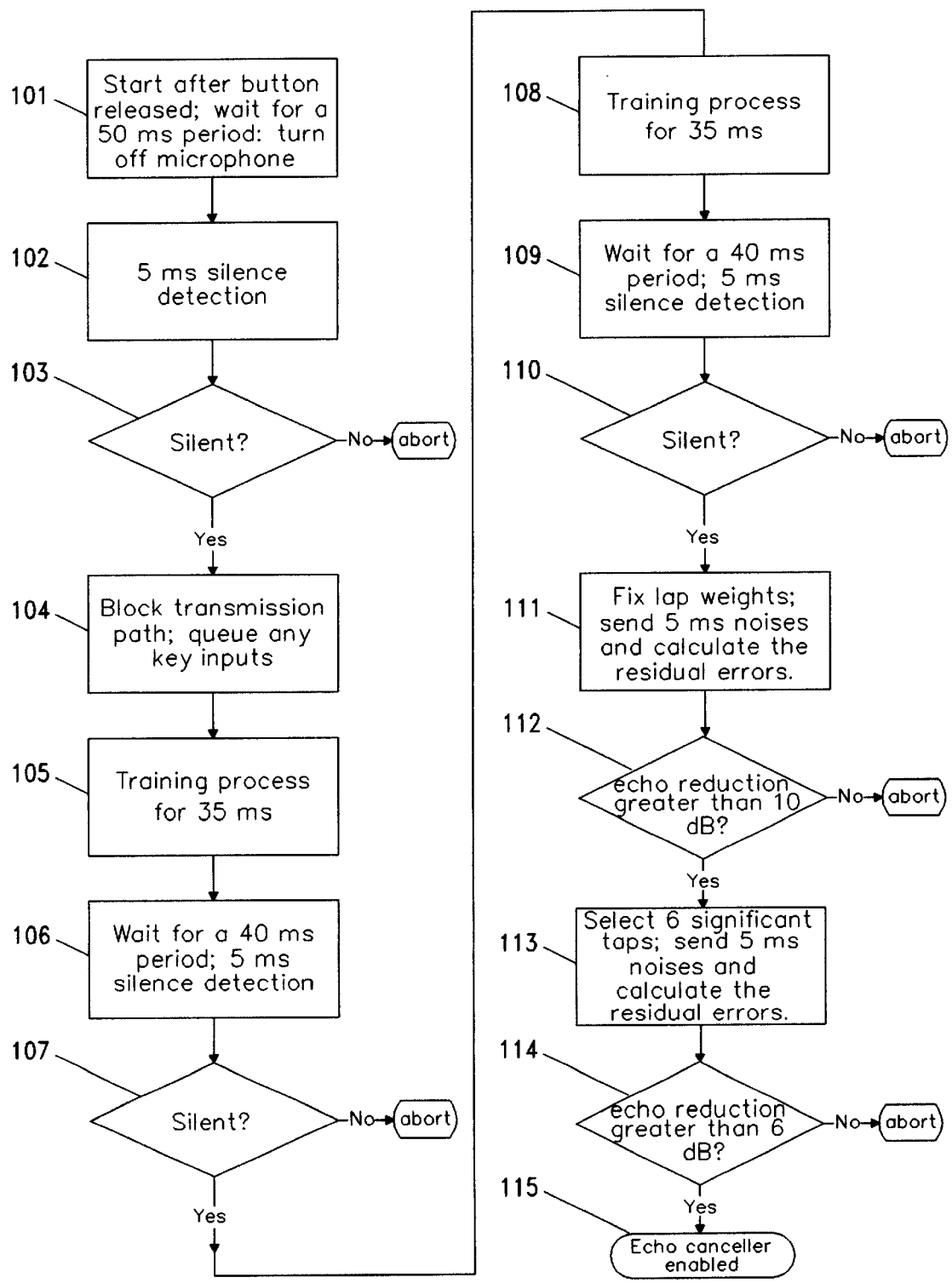
FIG. 3 is a flow diagram of an echo canceler adaptation procedure according to the invention.

FIG. 3 is a block diagram showing one embodiment of a procedure according to the invention for setting selected echo coefficients in an adaptive filter of the echo canceler.

Step 101 is initiated by the release of a keypad button and includes establishing a certain delay period and then turning off the microphone at the telephone instrument handset.

In step 102 the microphone is monitored and if no sounds are heard for five milliseconds, a decision block in step 103 triggers a step 104 in which the transmission path is blocked and transmission of any subsequent key inputs is delayed.

Then, in steps 105–110, there is performed a cyclic process which includes training operations (steps 105, 108) and wait periods and silence detection (steps 106, 107, 109 and 110). The training operations need not be performed after a first keypad actuation. In fact, it is preferable that the training operations be carried out after inputting of the second digit which is inputted. During calls when only one digit is inputted, for example when the operator is called, the training process may not be reliable.

The training signal is applied by using switch 19 to disconnect the modem 2 and connect to noise generator 18 in steps 105, 108 and may be constituted by filtered white noise generated by noise generator 18, using uniform distributed random sequences applied through a low pass filter as an input. The training signals can be given a desired bandwidth, it having been found that larger bandwidth signals produce improved echo reduction.

Based on experiments which have been conducted to date, it has been found that a 4th order Butterworth low pass filter with a three dB bandwidth of 3.6 kHz provides a good signal for training purposes.

The training signal level can vary over a certain range and should be large enough to provide a satisfactory signal-noise ratio and small enough to avoid erroneously triggering various telephone functions. It has been found preferable that the training signal level be in the range of −25 to −15 dBm, corresponding to a signal voltage in the order of 45–150 vMrms.

In addition, for a LMS algorithm, the step size of filter coefficient changes affects convergence performance. The optimum step size varies with training signal levels and the following relationship between the various input signal levels and optimum step size has been found to exist.

| Input signal (vpp) | 4.0 | 2.0 | 1.0 | 0.5 | 0.25 |
|---|---|---|---|---|---|
| Step size (v) | 0.0078 | 0.0313 | 0.125 | 0.5 | 2.0 |

The silence detection performed in steps 102, 106 and 109, serves the purpose of detecting whether the telephone line is silent, except for the training signal, before, during and after a training phase. This will assure that training is performed under conditions when no incoming signal is on the telephone line. During this step, the line is considered to not be silent if any sample voltage larger than 5 mV is detected during the 5 ms interval.

It has been found that the training period should be at least 30 ms and that a training period of 100 ms allows filter coefficient values to be accurately determined.

As indicated by the flow diagram of FIG. 3, it is preferable that the training period be divided into two subperiods each having a duration of essentially 35 ms, with an interval of 45 ms between them to assure that the training signal will not have any adverse effect on telephone networks.

The training process involves the use of a known algorithm, such as a LMS algorithm to determine the appropriate filter coefficients at all taps. This represents the operation performed in step 111 of FIG. 3. The process performed in steps 111 through 115 includes sending filtered noise signals two times for a period of 5 ms each (steps 111 and 113) and examining the output of the adaptive filter if all taps were adjusted (step 112), and the output of the adaptive filter if six filter coefficients have been set to finite values and the remainder to a zero value (step 114). If the average residual error in the case when all filter coefficients have been set is not more than 10 dB below the level of the input to the canceler, or in the case of truncated tap control, i.e. control of a limited number of filter coefficients, the average residual error is not more than 6 dB below the level of the canceler input signal, the training process is aborted, the current filter coefficients are canceled, the echo canceler is disabled, and the previous filter coefficients are reloaded (step 115).

Filter adaptation techniques and algorithms are already known in the art and the present invention proposes to utilize any suitable one of these the techniques, modified to identify a selected number of the most significant filter coefficients which have the largest values. The locations of the taps associated with these coefficients can, of course, vary from one training operation to another.

The solution proposed by the present invention is based on the assumption that only small variations will occur in loop characteristics during a single telephone call. Although there is evidence that this assumption is generally correct, it has not yet been verified by sufficiently exhaustive testing.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for setting the initial values of coefficients of an adaptive filter used for minimizing echo signals in a reception path of a digital cordless telephone said method being performed between the second and third digits dialed after the telephone goes off the hook, the method comprising:

supplying a test signal through the echo path;

monitoring the response of the device to the test signal;

separating filter coefficients into a first and second group;

selecting the coefficients of the first group based on initial values of greatest magnitude; and zeroing coefficients of the second group having initial values of lesser magnitude.

2. The method of claim 1 comprising determining the initial values for all of the adaptive filter coefficients at the start of a conversation.

3. The method of claim 1 comprising selecting and no longer adapting the first group of coefficients having initial values of greatest magnitude, constituting less than all of the coefficients and for retaining the initial values of the first group of coefficients throughout the conversation.

4. The method of claim 1 wherein determining initial values for all of the adaptive filter coefficients comprises monitoring echo propagation along the echo path and adjusting the filter coefficient values in response to the monitored echo signal propagation.

5. The method of claim 1 wherein said digital cordless telephone comprises a handset from which signals are transmitted in the form of packets which are transmitted at spaced time intervals.

6. The method of claim 1 wherein said adaptive filter is a digital finite impulse response filter.

7. The method of claim 1 wherein said adaptive filter produces an output signal constituting a predicted echo signal.

8. The method of claim 1 wherein said digital cordless telephone comprises both a handset and a base station.

9. The method of claim 1 wherein the digital cordless telephone comprises a keypad provided with a plurality of numeric keys and said method is performed in response to actuation of a selected number of keys.

10. A method for setting the initial values of coefficients of an adaptive filter used for minimizing echo signals in a reception path of a digital cordless telephone said method being performed between dialed digits after the telephone goes off the hook, the method comprising:

supplying a test signal through the echo path; and monitoring the response of the device to the test signal.

11. The method of claim 10 comprising determining the initial values for all of the adaptive filter coefficients at the start of a conversation.

12. The method of claim 10 wherein said setting the initial values of the coefficients comprises selecting and no longer adapting the coefficients and for retaining the initial values of the coefficients throughout the conversation.

13. The method of claim 10 wherein determining initial values for all of the adaptive filter coefficients comprises monitoring echo propagation along the echo path and adjusting the filter coefficient values in response to the monitored echo signal propagation.

14. The method of claim 10 wherein said digital cordless telephone comprises a handset from which signals are transmitted in the form of packets which are transmitted at spaced time intervals.

15. The method of claim 10 wherein said adaptive filter is a digital finite impulse response filter.

16. The method of claim 10 wherein said adaptive filter produces an output signal constituting a predicted echo signal.

17. The method of claim 10 wherein said digital cordless telephone comprises both a handset and a base station.

18. The method of claim 10 wherein the digital cordless telephone comprises a keypad provided with a plurality of numeric keys and said method is performed in response to actuation of a selected number of keys.

19. The method of claim 10 wherein the method is performed between second and third digits dialed after the telephone goes off hook.

* * * * *